United States Patent [19]

Sharp et al.

[11] Patent Number: 5,844,734
[45] Date of Patent: Dec. 1, 1998

[54] DISPERSIVE FABRY-PEROT INFRARED MULTIWAVELENGTH OPTICAL FILTER

[75] Inventors: Edward J. Sharp, Fort Washington, Md.; Richard R. Shurtz, II, Oakton, Va.

[73] Assignee: The United States of America as represented by the Secretary of the Army, Washington, D.C.

[21] Appl. No.: 492,063

[22] Filed: Apr. 28, 1983

[51] Int. Cl.[6] ........................................................ G07F 1/16
[52] U.S. Cl. .......................... 359/885; 359/589; 359/601; 356/352
[58] Field of Search ............................. 350/1.6, 1.7, 162, 350/163, 168, 316, 317, 320; 356/349, 352; 332/7.51; 372/99; 357/589, 601, 885

[56] References Cited

U.S. PATENT DOCUMENTS

| | | | |
|---|---|---|---|
| 3,358,243 | 12/1967 | Collins et al. | 356/352 |
| 3,672,746 | 6/1972 | Miller | 350/359 |
| 3,699,347 | 10/1972 | Buchar et al. | 350/356 |
| 3,930,718 | 1/1976 | Jensen | 350/356 |
| 4,204,771 | 5/1980 | Shull | 356/352 |
| 4,448,486 | 5/1984 | Evans | 356/352 |

OTHER PUBLICATIONS

Grischowsky et al, "Double–Fabry–Renot Filter" Jan. 1972, p. 2500, IBM Tech. Disc Bull., vol. 14, #8.
Gustafssar et al, Wavelength Scanning . . . , Nov. 1979, pp. 1100–1102, J. Phys. B: Sci Instr., vol. 12, #11.
Frolich et al, "Tuning Properties . . . Fabry–Perot'Etalon", Mar. 1976, pp. 205–207, Appl. Physi., vol. 9, #3.

*Primary Examiner*—Nelson Moskowitz
*Attorney, Agent, or Firm*—Nathan Edelberg; Milton W. Lee; Aubrey J. Dunn

[57] ABSTRACT

An optical material having an index of refraction related to wavelength is placed between the reflectors of a Fabry-Perot cavity employed as an interference filter. The cavity is skewed with respect to the optical path of incident radiation such that the material diverts the optical paths of different spectral lines and the filter response more nearly matches the line spectrum.

1 Claim, 3 Drawing Sheets

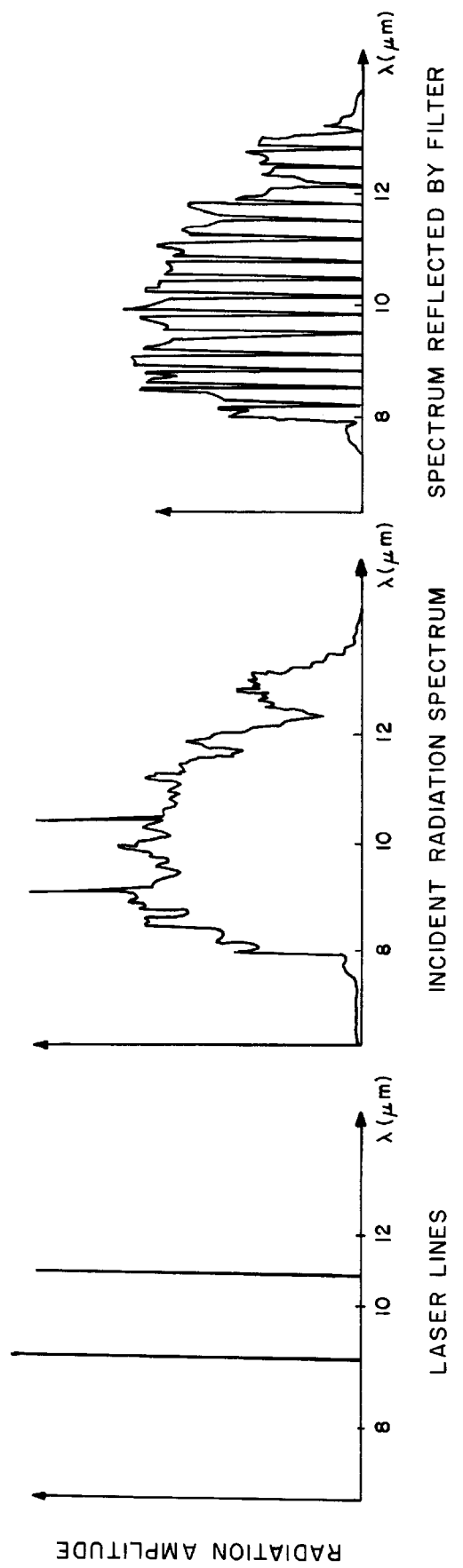

DISPERSIVE FABRY-PEROT INFRARED MULTIWAVELENGTH OPTICAL FILTER

The invention described herein may be manufactured, used, and licensed by the U.S. Government for governmental purposes without the payment of any royalties thereon.

BACKGROUND OF THE INVENTION

This invention is in the field of optical photo-detector (hereinafter called detector or optical detector) protectors. Such protectors are used to protect sensitive optical detectors from high-intensity incident radiation, and are of two general types: active and passive. The active types include various shutters (mechanical or electro-optic) and photochromatic glasses or photosensitive materials; the passive types include neutral density or interference filters. Obviously, the particular protector for a particular application is determined by such factors as sensitivity frequency response and response time of the detector being used, by the frequency spectral bandwidth and intensity of the source against which protection is desired, and by other factors such as weight and power requirements. For broad spectrum sources such as sunlight, one would have different requirements than for a narrow bandwidth source such as a laser. Perhaps the best-known example of a broad-spectrum protector is the photochromatic glass used in sunglasses. In order to protect a television camera from direct sunlight, a mechanical shutter may be employed. An ideal protector must fulfill various requirements: it must not degrade or attenuate desired radiation, it must provide complete blocking of radiation (harmful to the detector) above some predetermined threshold, it must have a wide enough optical bandwidth to cover the (undesired) radiation from which protection is desired, and it must (in many cases) be fast-acting. Unfortunately, in some cases, these requirements may be mutually contradictory. For example, the radiation of interest may be completely obscured by undesired radiation. Of late, there has been considerable interest in protecting infrared detectors against high-power infrared lasers. Such detectors are used as night-vision devices by the military and are susceptable to such high-energy laser enemy countermeasures. The output of such a laser is at a nominal frequency within the response band of the detector in a night-vision device. Various techniques have been proposed for combating the laser: one technique uses a stacked array of Fabry-Perot interference filters, one for each spectral line of the laser, and another technique physically moves a particular interference filter in the detector line of sight for a particular anticipated laser. Unfortunately, a laser such as a $CO_2$ laser has a large number of spectral lines, and individual filters are unwieldy and impractical. One might think that these spectral lines would be harmonically related such that a single Fabry-Perot filter would respond to many of them; unfortunately, this is not true—the response peaks of the known Fabry-Perot filters vary from the spectral lines of a $CO_2$ laser except for some predetermined central line. The present invention overcomes this problem. The teachings of the invention may be used not only to protect night-vision devices, but other sensitive photo-detectors, such as television camera tubes (or solid state detectors), photographic film, and the human eye.

SUMMARY OF THE INVENTION

This invention is a dispersive Fabry-Perot interference filter capable of passing multiple wavelengths from a laser, and of reflecting desired radiation in order to protect a sensitive detector operating with a bandwidth including the laser wavelengths. There are two embodiments of the invention, but the same general arrangement is used in both. Specifically, a Fabry-Perot optical cavity is defined by two partially reflecting and parallel mirrors, spaced apart a distance dependent on laser wavelength, among other things. Between the mirrors, a (dispersive) transparent material having an index of refraction related to wavelength, is placed. The effect of the material is to refract the various spectral lines (wavelengths) such that the path that each takes between the mirrors is one-half wavelength for each particular wavelength. Thus, each spectral line of the laser is passed by the filter, but other wavelengths are reflected. One embodiment uses a single filter with the transparent material between the mirrors; the other uses two of these filters orthogonal to each other, and with a plane, highly reflective mirror placed to reflect incident radiation off both filters.

BRIEF DESCRIPTION OF THE DRAWING

FIG. 3 shows a chart of two of the output lines of a $CO_2$ laser.

FIG. 4 shows a chart of the incident radiation onto the invention filter.

FIG. 5 shows a chart of the reflected radiation from the invention filter.

DESCRIPTION OF PREFERRED EMBODIMENTS

Figure 1:
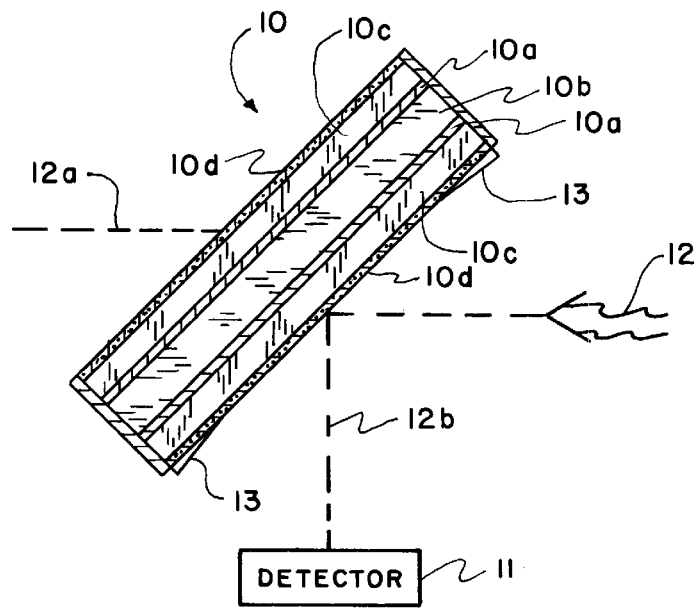
FIG. 1 is a schematic showing of one embodiment of the invention.

The invention may be best understood when this description is taken in conjunction with the drawings. In the drawings, FIG. 1 shows an optical system including inventive filter 10 and a detector 11. As can be seen, incoming radiation 12 is incident onto filter 10. Radiation 12 may include light (visible or infrared) from a scene, and laser light from a laser being used in an attempt to overload or damage detector 11. The particular structure of filter 10 is such that the laser light from 12 is transmitted through 10 (as ray 12a, for example) and the scene light is reflected from 10 (as ray 12b, for example) to fall on detector 11.

Figures 6, 7:
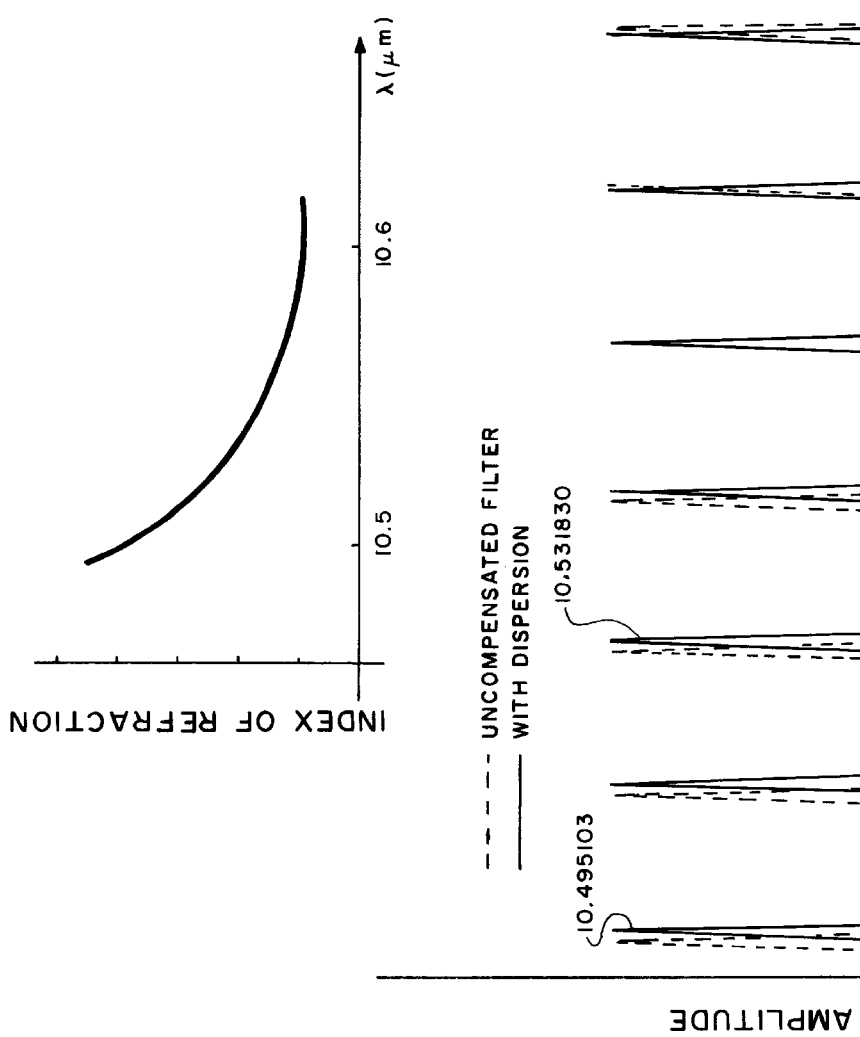
FIG. 6 shows charts of a Fabry-Perot filter response with and without the inventive teachings.
FIG. 7 show a chart of the index of refraction for dispersive material.

The particular structure of filter 10 is as follows: layers 10a are partially reflecting mirrors on either side of dispersive material 10b; on the outside of layer 10a are windows 10c coated with antireflection layers 10d. Also shown on filter 10 are optional vignetting wedges 13. Material 10b has an index of refraction dependent on the wavelength of electromagnetic energy passing therethrough, as shown by the chart of FIG. 7. This material may be chosen from (but is not limited to) $CO_2$, $N_2$, $H_2$, seawater, NaCl, $As_2 S_3$ and $BaF_2$. The spacing between the mirrors is determined by the following equation:

$$2nd \cos \theta = m\gamma$$

wherein n is index of refraction of the material between the mirrors, $\gamma$ is wavelength of a chosen spectral line of expected incoming radiation, d is the distance between the mirrors, m is the order number of the Fabry-Perot etalon, determined by the effective optical path length between the mirrors, and varies as n varies with γ, and θ is the incidence angle on the dispersive material.

FIG. 6 shows, in the heavy arrows along the abscissas of the spectrum chart, typical output lines of a $CO_2$ laser in the region of 10.6 μm, but with only a few of the lines labeled. The dotted line graph shows the response of a normal (uncompensated) Fabry-Perot filter. As can be seen, the response peaks of this filter vary from the laser lines. The solid line graph shows the response of a filter made in accordance with the invention, i.e. using dispersion; the response of this filter is a good match to the laser lines. In order to achieve the solid-line response chart of FIG. 6, a material with a variable (in accordance with incident wavelength) index of refraction is used. The chart of such a material is shown in FIG. 7. When the material is used as dispersive material 10b in Filter 10 of FIG. 1, the invention will function as desired, i.e., the laser radiation in radiation 12 falling on 10 will be transmitted, and the desired scene information will be reflected to detector 11L. Vignetting wedges 13 are formed of a neutral density filter material and are intended to eliminate edge effects of the tilted filter.

Figure 2:
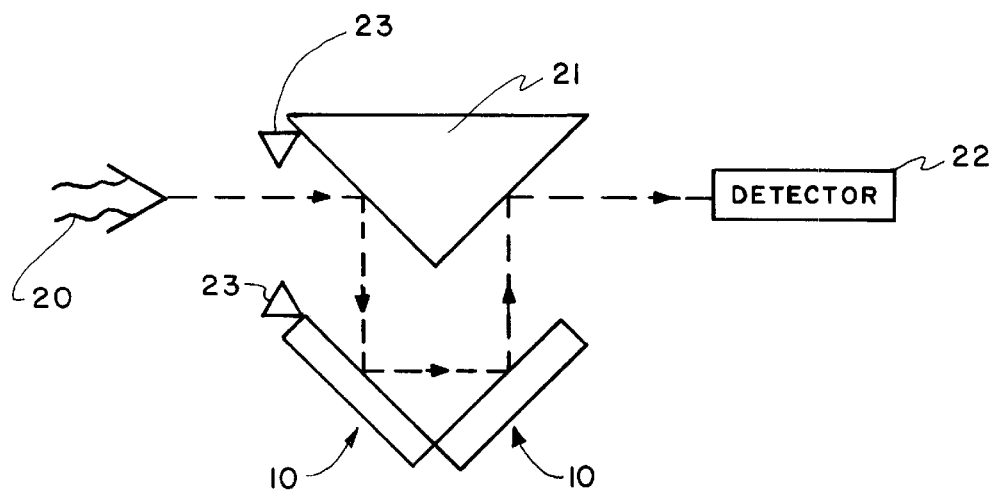
FIG. 2 is a schematic showing of another embodiment of the invention.

The embodiment of FIG. 2 eliminates edge effects by employing two filters similar to filter 10 of FIG. 1, whereby incoming radiation 20 is reflected by mirror 21 onto filters 10 and detector 22. In addition, aperture stop 23 may be used. Thus, the desired portion of radiation 20 is reflected by filters 10 and mirror 21 onto detector 22.

We claim:

1. A dispersive Fabry-Perot multiwavelength optical filter including a pair of parallel partially reflecting mirrors, and means for directing incoming radiation between said mirrors at an angle dependent on wavelength.

* * * * *